No. 785,387. PATENTED MAR. 21, 1905.
N. L. & W. W. TUCK.
FUEL INJECTOR FOR OIL ENGINES.
APPLICATION FILED JULY 22, 1903. RENEWED FEB. 21, 1905.
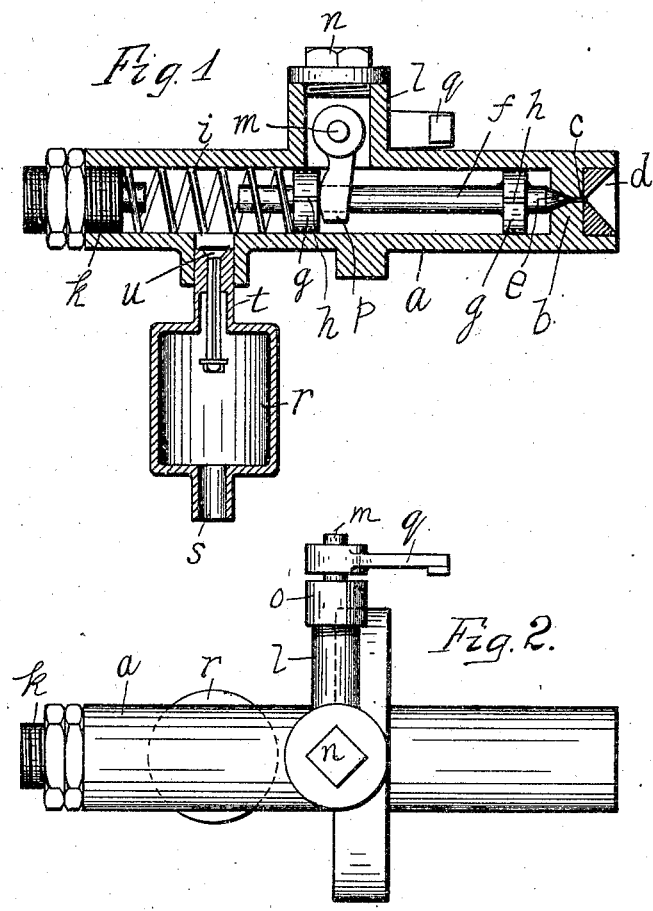

No. 785,387.

Patented March 21, 1905.

UNITED STATES PATENT OFFICE.

NELSON L. TUCK AND WILLIAM W. TUCK, OF BROOKLYN, NEW YORK.

FUEL-INJECTOR FOR OIL-ENGINES.

SPECIFICATION forming part of Letters Patent No. 785,387, dated March 21, 1905.

Application filed July 22, 1903. Renewed February 21, 1905. Serial No. 246,779.

*To all whom it may concern:*

Be it known that we, NELSON L. TUCK and WILLIAM W. TUCK, citizens of the United States, and residents of Brooklyn, in the county of Kings and State of New York, have invented a certain new and useful Improvement in Fuel-Injectors for Oil-Engines, of which the following is a specification.

This invention relates to fuel-injectors for hydrocarbon or internal-combustion engines, and has for its object the positive control of the fuel-supply.

The invention consists of features of construction, arrangements, and combinations of devices, all hereinafter described, and more particularly pointed out in the appended claims.

The preferred form of the invention is illustrated in the accompanying drawings, forming part hereof, in which—

Figure 1 is a longitudinal sectional view of an apparatus in which the invention is embodied, and Fig. 2 is a plan view of the same.

In the drawings the reference $a$ marks a tubular casing having a diaphragm $b$ therein near that end which is toward the cylinder. (Not shown.) The diaphragm $b$ has a conical valve-seat at the inner side thereof and is perforated axially of the injector at $c$. A perforated bell $d$ fits in the end of the casing and against the diaphragm $b$ with its perforation in line with and forming a continuation of that of the diaphragm.

Within the casing $a$ is a conical valve $e$, whose stem $f$ is provided with guide-disks $g$, fitting the bore of the casing, as shown. The stem $f$ is provided with an area greater than that part of the cone $e$ left exposed to the pressure in the casing $a$ when the valve is seated, and said greater area is so disposed that the pressure thereon tends to seat the valve. This greater area is provided very conveniently by having the valve-stem $f$ wholly within the casing $a$, so that its end provides said greater area. These disks are grooved or channeled at $h$ to provide passage-ways for the hydrocarbon. A spring $i$ acts between a disk $g$ and a screw-plug $k$, which closes the other end of the casing $a$, the spring tending to keep valve $e$ on its seat.

At one side the casing $a$ has a tubular branch $l$, through which a shaft $m$ extends, a plug $n$ closing said branch, as shown in Figs. 1 and 2, and a stuffing-box $o$ closing the branch, as shown in Fig. 2. The shaft $m$ is provided with an arm $p$ within the casing $a$ and arranged to move the valve $e$ against the force of the spring $i$ and with an arm $q$ outside of the casing $a$ and arranged to be operated at the proper times by any suitable means (not shown) to open the valve $e$.

The hydrocarbon fuel is pumped into a reservoir or tank $r$ (pump not shown) through the tube $s$ and passes through a tube $t$ to the casing $a$, the tube $t$ being screwed into a nipple on the casing $a$, as shown. The tube $t$ is provided with a check-valve $u$, which opens toward the injector and prevents communication from the injector toward the tank $r$, while permitting free communication in the reverse direction, whereby flame cannot get to the tank even should it reach the casing $a$—an improbable contingency.

In engines wherein oil is employed as the explosive agent great difficulty is encountered owing to the fact that the oil will leak through the valve of the injector and dribble into the cylinder and becoming more or less carbonized and also causing smoke. In the present invention these difficulties are overcome or avoided, since the check-valve $u$ next the injector and the reservoir $r$, connected through said check-valve $u$ with the injector, in which reservoir $r$ a high oil-pressure is maintained by the pump and its check-valve, (not shown,) enable us to keep up a high pressure on the end of the valve-stem $f$, and thereby to keep the valve on its seat in an oil-tight manner, except at the times when the valve is opened automatically to admit oil to the cylinder, even at the moment of explosion—a thing the spring $i$ will not do unaided, although it seats the valve at other times, whereby carbonization and smoke are avoided.

The operation of the above-described device is obvious and need not be further defined.

What is claimed is—

1. In an oil-engine, an oil-injector having an inwardly-opening valve, an oil-reservoir connected with said injector, a check-valve between said reservoir and said injector, and means for maintaining oil-pressure on said valve to keep it seated, in combination with means for opening said valve.

2. In an oil-engine, a closed tubular casing having one end perforated and provided on the inside with a valve-seat, a valve coacting with said seat and provided with a stem wholly within the said casing, perforated guide-disks for keeping the stem and valve centered in the casing, a spring for seating said valve, and means for opening said valve, all in combination.

Signed at New York, in the county of New York and State of New York, this 21st day of July, A. D. 1903.

NELSON L. TUCK.
WILLIAM W. TUCK.

Witnesses:
FRANK RYALL,
R. W. BARKLEY.